April 17, 1962 T. KORNEFF ET AL 3,029,685
HIGH SPEED CAMERA
Filed Oct. 21, 1959 2 Sheets-Sheet 1
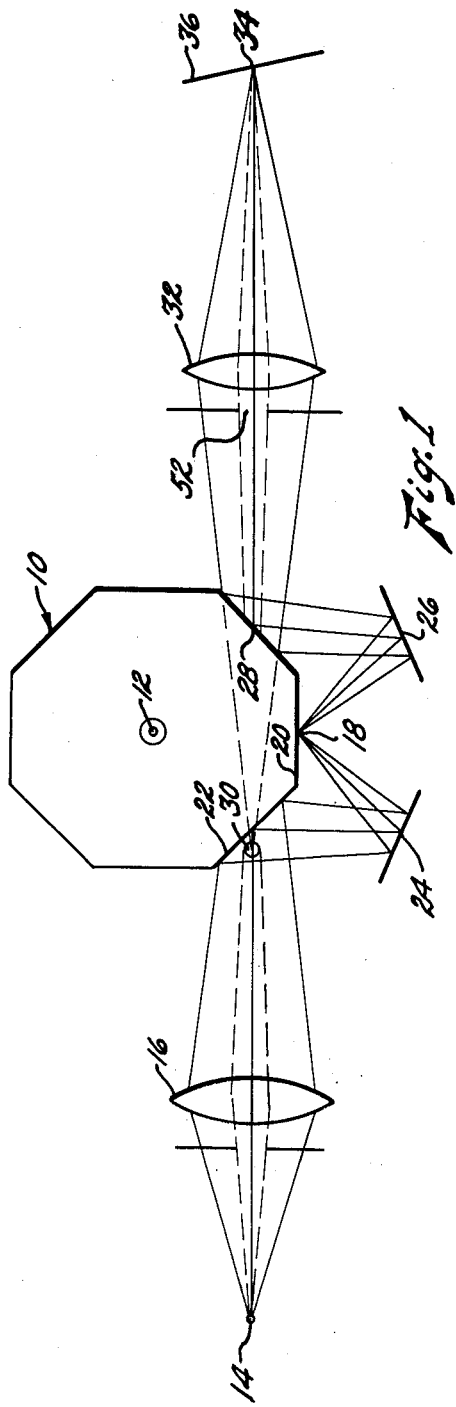
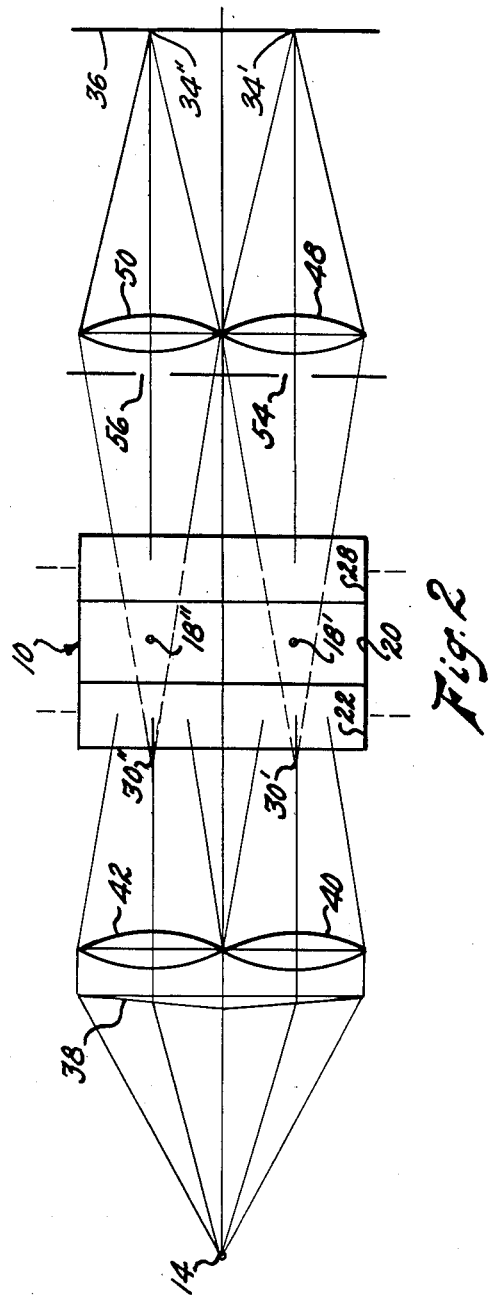
INVENTORS
THEODORE KORNEFF
JACOB L. BORN
AND FRANCIS H. NADIG
BY
Wade Coonty
Sherman H. Goldman
ATTORNEYS

United States Patent Office 3,029,685
Patented Apr. 17, 1962

3,029,685
HIGH SPEED CAMERA
Theodore Korneff, Burlington, N.J., and Jacob Lloyd Bohn, Glenside, and Francis H. Nadig, Philadelphia, Pa., assignors to the United States of America as represented by the Secretary of the Air Force
Filed Oct. 21, 1959, Ser. No. 847,854
4 Claims. (Cl. 88—16.6)

The present invention relates generally to high speed photography and is more particularly concerned with an improved system for producing a series of photographic images by the use of a rotating reflector with an image multiplication system.

Photographing exploding wire or other exploding materials presents several difficult problems which must be solved before photographs containing sufficient detail can be produced. Three major conditions must be fulfilled. The image of the explosion must be substantially stationary on the photographic film to avoid obtaining a space smear photograph. A group of successive photographs of a single explosion is desirable. The photograph of each group must have exposure times on the order of one microsecond or less with a substantial comparative time lapse between them.

In order to obtain photographs at various stages of the explosion, several expedients were tested with varying degrees of success; however, the exposure time was excessive and, as a result, the resultant photographs lacked sufficient detail to provide adequate information. Attempts to obtain a series of photographs of each explosion were successful only after an image multiplier was used. The system which includes the multiplier of this invention comprises a beam splitter, lens and mirror arrangement which form separate, independent images of an object to be photographed. Although the invention is described relative to a double optical system, the number of images could be increased by utilizing a triple or greater optical system in accordance with the teachings herein.

One of the main problems of image multiplication discussed in our copending applications, Serial Numbers 769,048, now Patent No. 2,961,918, and 835,373, filed October 23, 1958 and August 21, 1959, respectively, involves the reduction of intensity of a beam which is divided. The optical system of this application allows for an increase in the number of images beyond that accomplished by our prior applications without an accompanying decrease in intensity.

It is the primary object of this invention to provide a system of the type described above having an improved image multiplication system.

More specifically it is an object of this invention to provide an image multiplier arrangement which produces multiple virtual images of the object to be photographed which may be photographed in succession to give a series of images with respect to time.

It is a further object of this invention to provide a novel image multiplication arrangement which does not produce a reduction in intensity with an increase in the number of images.

The above, and still other objects, advantages, and features of our invention will become more readily apparent from consideration of the following detailed description thereof, especially when taken in conjunction with the accompanying drawings, wherein:

FIGURE 1 is a schematic illustration of a basic rotating mirror system;

FIGURE 2 is a schematic illustration looking from the bottom of the system shown in FIGURE 1 and incorporating the novel image multiplication arrangement with the mirror arrangement removed for clarity;

In the drawings like numerals are used to designate like parts.

Figure 3:
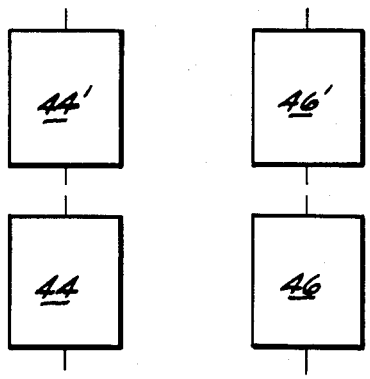
FIGURE 3 illustrates the mirror arrangement utilized with the device of FIGURE 2.

The basic system shown in FIGURE 1, disclosed in the aforementioned copending applications, operates primarily on the principle of the rotation of a light beam by a rotating mirror, and a brief explanation of this principle is presented. A multi-faced mirror is shown at 10. This mirror is here shown as octagonal and rotates about an axis through the point 12. The mirror 10 is preferably made of transparent plastic with the faces thereof aluminized. Rotation of the mirror 10 produces rotation of any light beams which strike it.

The reference character 14 designates a point in an object to be photographed. Light diverges from the point and falls upon a lens 16, converging at the point 18 on a face 20 of the mirror 10. The converging pencil of light undergoes two reflections in its passage from lens 16 to the point of convergence 18, one from a face 22 of the mirror and one from a stationary plane mirror 24. The light is reflected at 18 from the face 20 and proceeds as a diverging pencil. After being reflected by another stationary plane mirror 26 and a face 28 of the mirror 10, it forms a virtual image of point 18, and hence of the point 14, at a point 30 in FIGURE 1. This virtual image at 30 of point 14 of the object to be photographed serves as a real image for a lens 32 which forms a real image of point 30 at 34 on a photographic plate 36. Thus, the diverging pencil of light rotates such that the light in this beam sweeps past an aperture 52 forming an image of 30 on the photographic plate.

FIGURES 2 and 3 represent an improved method for producing multiple images and shows diagrammatically the image formation of this system. By utilizing a double or triple (or more) optical system, image multiplication may be achieved without an accompanying decrease in intensity. The embodiment of FIGURE 2 shows the point 14 of an object. A beam splitter shown as a biprism 38 forms the beams from 14 into two systems of rays which are parallel, thus avoiding a divergence which would require an impractical arrangement of succeeding optical elements. A pair of lenses 40 and 42 are used to form two independent images of the object; however, for simplicity, only the point source 14 will be considered. Lens 42 is positioned, as shown, with respect to lens 40 thereby providing two similar and independent systems of beams of the type described relative to FIGURE 1 and in our copending applications 769,048, now Patent No. 2,961,918 and 835,373 with the difference that the beams are spaced. Lenses 40 and 42 form images 18' and 18" on mirror face 20 of mirror 10. FIGURE 3 shows, schematically, mirrors 44, 44' and 46, 46' which are utilized with the embodiment of FIGURE 2 in the position of mirrors 24 and 26 shown in FIGURE 1.

Mirrors 44, 44' and 46, 46' comprise double mirrors with 44' mounted in alignment with 44 and 46' mounted in alignment with 46. Mirror elements 44 and 44' are independently rotatable about their axis as are mirror elements 46 and 46'. Mirrors 46 and 46' with surface 28 of mirror 10 form virtual images 30' and 30". Camera lenses 48 and 50 form images 34' and 34", respectively, of 30' and 30" on photographic plate 36.

Figure 4:
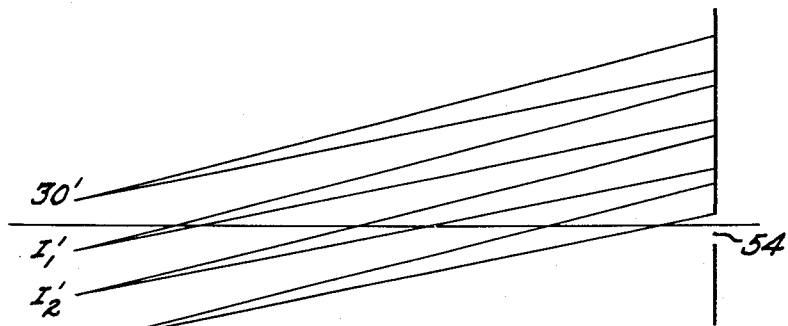
FIGURE 4 illustrates the formation of successive images of the lower system of FIGURE 2.
Figure 5:
FIGURE 5 illustrates the formation of successive images of the upper system of FIGURE 2.

Referring to FIGURES 4 and 5, when mirror 10 has been rotated counter-clockwise to a position where the beam from virtual image $I_3'$ of FIGURE 4, as formed by the lower system using lens 40 of FIGURE 2, has passed the aperture 54 and mirrors 44', 46' adjusted so the position of beams from 30'', $I_1''$ etc. of the upper system are as shown in FIGURE 5. Thus, it is apparent that further rotation of mirror 10 will now cause beams from 30'', $I_1''$, etc to pass aperture 56 to give rise to a second series of images on the photographic plate spaced from the series produced by the passage of the beam from 30', $I_1'$, etc. across the aperture.

If there are $n$ images in the lower row on the photographic plate, a double beam system will yield $2n$ images. In accordance with the above-defined principles, a third system whereby elements 40, 42 and 44, 44' and 46 and 46' are replaced by triple elements, the third system will give $3n$ images, etc.

Although the invention has been described with reference to a particular embodiment, it will be understood by those skilled in the art that the invention is capable of a variety of alternative embodiments within the spirit and scope of the appended claims.

We claim:

1. In a multiple image system for producing a series of spaced images of a rapidly occurring phenomenon to be photographed comprising means for splitting a beam of light from said phenomenon to be photographed into multiple beams, a rotating member having a plurality of reflecting surfaces thereon, said rotating member being positioned to receive said multiple beams of light from said means on one of said reflecting surfaces which is inclined with respect to the beams from said means for splitting a beam of light, a pair of oppositely inclined reflectors for each beam of said multiple beams, one of each of said pairs of reflectors being positioned adjacent said rotating member to receive a separate beam from the said surface and oriented to reflect the beam incident thereon to an adjacent surface of said rotating member, the other of each of said pairs of reflectors being positioned adjacent said rotating member to receive the beam reflected by said adjacent surface and oriented to reflect said received beam to the next successive surface of said rotating member, a member having apertures therein corresponding to the number of said beams reflected from said last-mentioned surface, the apertures of said member being positioned to receive the beams of light reflected from the said next successive surface of said rotating member and photographic means arranged to receive the beams from said apertures for recording a series of spaced images of said rapidly occurring phenomenon.

2. A system as defined in claim 1 wherein said means for splitting a beam comprises a biprism.

3. In a multiple image system for providing a series of spaced images of a rapidly occurring phenomenon, a beam of light emanating from said phenomenon, means for splitting said beam into a number of beams, a rapidly rotating prism having a plurality of reflecting faces thereon positioned to receive the beams from said means for splitting a beam on a reflecting face inclined with respect to the direction of said beams, a pair of oppositely inclined reflectors for each beam of said number of beams arranged to receive beams reflected from said first-mentioned face and reflect said beams to successive faces of said rotating member, a member having apertures therein corresponding to the number of beams and arranged in the path of the beams reflected from the third face of said rotating member to receive said beams to permit said beams to pass therethrough, and means in alignment with said third face of said rotating member for receiving said beams of light from said apertures and forming a series of spaced photographs of successive images of the beams directed through said apertures.

4. A system as defined in claim 3 wherein said means for splitting a beam comprises a biprism.

References Cited in the file of this patent
UNITED STATES PATENTS

| | | |
|---|---|---|
| 1,410,557 | Douglass | Mar. 28, 1922 |
| 1,957,371 | Thomas | May 1, 1934 |
| 2,687,062 | Baird | Aug. 24, 1954 |
| 2,834,270 | Williams | May 13, 1958 |
| 2,853,918 | Yoler | Sept. 30, 1958 |